United States Patent
Viana Mancuzo et al.

(10) Patent No.: US 12,196,579 B2
(45) Date of Patent: Jan. 14, 2025

(54) CONTINUOUS MONITORING SYSTEM OF DYNAMIC EQUIPMENT CONDITION

(71) Applicants: Petróleo Brasileiro S.A. - Petrobras, Rio de Janeiro (BR); Universidade Federal De Uberlândia—UFU, Uberlândia (BR)

(72) Inventors: Mechelangelo Viana Mancuzo, Rio de Janeiro (BR); Lucas Altamirando De Andrade Da Rocha, Uberlândia (BR); Marcus Antônio Viana Duarte, Uberlândia (BR); Marcelo Barros De Almeida, Uberlândia (BR); Marden Ambrósio Fagundes, Uberlândia (BR); Valder Steffen Junior, Uberlândia (BR); Fabrício Lucas De Almeida, Uberlândia (BR); Victoria Maria Veloso Rodrigues, Uberlândia (BR); Adriel Luiz Marques, Uberlândia (BR); Márcio José Da Cunha, Uberlândia (BR); Aldemir Aparecido Cavalini Junior, Uberlândia (BR); Karina Mayumi Tsuruta, Uberlândia (BR); Sérgio Augusto Albino Vieira, Uberlândia (BR); Felipe Carmo Carvalho, Uberlândia (BR); Geisa Arruda Zuffi, Uberlândia (BR); Fabrício Vieira De Oliveira, Uberlândia (BR); Orlando Tomaz Da Silva Neto, Uberlândia (BR); Lukas Gabriel Dias Gomes, Uberlândia (BR); Roberto Mendes Finzi Neto, Uberlândia (BR); Ronaldo Pires Da Silva, Uberlândia (BR)

(73) Assignees: Petróleo Brasileiro S.A.—Petrobras, Rio de Janeiro (BR); Universidade Federal De Uberlândia—UFU, Uberlândia (BR)

( * ) Notice: Subject to any disclaimer, the term of this patent is extended or adjusted under 35 U.S.C. 154(b) by 0 days.

(21) Appl. No.: 18/067,220

(22) Filed: Dec. 16, 2022

(65) Prior Publication Data
US 2023/0199068 A1    Jun. 22, 2023

(30) Foreign Application Priority Data

Dec. 18, 2021    (BR) ...................... 10 2021 025706 7

(51) Int. Cl.
*G01D 21/02* (2006.01)
*G01H 17/00* (2006.01)

(52) U.S. Cl.
CPC ............. *G01D 21/02* (2013.01); *G01H 17/00* (2013.01)

(58) Field of Classification Search
CPC .......... G01D 21/02; G01H 17/00; G01H 1/04; G01H 3/00; H04L 67/12
See application file for complete search history.

(56) References Cited

U.S. PATENT DOCUMENTS 9,015,059 B2    4/2015  Sims et al.
10,644,579 B2 *  5/2020  Nerubenko ............... H02K 5/24
(Continued)

FOREIGN PATENT DOCUMENTS

CA          2632042 C  *  8/2012  ............. E21B 4/006
CN       109374120 A     2/2019
(Continued)

OTHER PUBLICATIONS

Zhang et al "a portable high-efficiency electromagnetic energy harvesting system using supercapacitors for renewable energy applications in railroads", (Year: 2016).*

(Continued)

*Primary Examiner* — Eyob Hagos
(74) *Attorney, Agent, or Firm* — Mintz, Levin, Cohn, Ferris, Glovsky and Popeo, P.C.

(57) ABSTRACT

The present invention proposes a system for continuous monitoring of dynamic equipment condition through the use of vibration, temperature and/or acoustic noise sensor modules associated with wireless technology (wireless) or LTE (Long Term Evolution). The system is characterized by having vibration, temperature and/or acoustic noise sensor modules. The sensor modules of the system also have the functionality to measure the sound signature of the machines.

13 Claims, 4 Drawing Sheets

(56) References Cited

U.S. PATENT DOCUMENTS

| | | | | |
|---|---|---|---|---|
| 2015/0280538 A1* | 10/2015 | Seok | ............... | H02K 35/02 |
| | | | | 310/25 |
| 2019/0020290 A1* | 1/2019 | Feng | ............... | H02J 50/20 |
| 2020/0284694 A1* | 9/2020 | Scott | ............... | G01H 1/00 |
| 2020/0395835 A1* | 12/2020 | Franchitti | ............ | H02J 50/001 |
| 2021/0028680 A1* | 1/2021 | Kim | ............... | G01M 15/05 |
| 2021/0257896 A1* | 8/2021 | Haronian | ............ | H02K 35/02 |
| 2021/0375115 A1* | 12/2021 | Roy | ............... | G08B 27/005 |
| 2023/0074890 A1* | 3/2023 | Muniraju | ............ | H02K 35/02 |

FOREIGN PATENT DOCUMENTS

| | | | | | |
|---|---|---|---|---|---|
| CN | 109813422 A | | 5/2019 | | |
| CN | 107769613 B | * | 8/2019 | ............ | H02N 2/185 |
| CN | 112636536 A | * | 4/2021 | | |
| CN | 113137351 B | * | 5/2022 | ........... | A43B 3/0015 |

OTHER PUBLICATIONS

Gholikhani et al. "Dual electromagnetic energy harvesting technology for sustainable transportation systems" (Year: 2021).*

Ullrich et al. "Shaft Integrated Electromagnetic Energy Harvester with Gravitational Torque" (Year: 2020).*

\* cited by examiner

CONTINUOUS MONITORING SYSTEM OF DYNAMIC EQUIPMENT CONDITION

CROSS-REFERENCE TO RELATED APPLICATION

This application claims priority to Brazilian Application No. BR 10 2021 025706 7, filed on Dec. 18, 2021, and entitled "CONTINUOUS MONITORING SYSTEM OF DYNAMIC EQUIPMENT CONDITION," the disclosure of which is incorporated herein by reference in its entirety.

FIELD OF THE INVENTION

The present invention is related to the field of continuous monitoring of the condition of dynamic equipment, more specifically with dynamic equipment monitored through the use of sensor modules with functionality for measuring vibration, temperature and sound signature (acoustic rumorosity) associated with technology wireless (wireless) or LTE (Long Term Evolution).

DESCRIPTION OF THE STATE OF THE ART

The technical problem that motivated the invention was the need of monitoring the condition of dynamic equipment, due to the high cost involved with the acquisition, installation and maintenance of wired asset monitoring systems, and due to the very high cost of amount of rework and damage to the cabling, and to the instrumentation itself of the current continuous asset monitoring systems during the construction and assembly phase of the oil processing units.

The continuous monitoring of assets is commonly performed through different sensors of vibration, temperature, among others. These sensors are connected to signal acquisition systems (digitization and processing) through cables. It is important to emphasize that, in general, the processing center/database of these signal acquisition systems is located in places far from the monitored equipment. In this context, the installation of the necessary cabling to connect the sensors and the signal acquisition systems becomes expensive and constitutes a challenging task in the vast majority of cases.

Additionally, new machines are often installed in existing plants and in continuous operation. In this scenario, the aforementioned cabling procedure is even more complex, involving the risk of damage to the cabling itself during installation, exposure of people to risk, long execution times and high implementation costs.

So far, due to the high cost involved with the acquisition, installation and maintenance of wireless continuous monitoring systems for assets, in the vast majority of operating units, only strategic equipment is continuously monitored for its vibration levels and temperature. The amount of rework and damage to cabling and instrumentation of current continuous asset monitoring systems during the construction and assembly phase of oil processing units is still high. This is due to the need for these systems to be assembled, from a certain step onwards, in parallel with other plant activities. In this way, the application of vibration, temperature and/or acoustic noise sensors associated with wireless technology (wireless) or LTE (Long Term Evolution) for asset monitoring becomes quite interesting.

Document U.S. Pat. No. 9,015,059-B2 discloses a wireless equipment management system for managing a plurality of equipment. FIG. 1 of document U.S. Pat. No. 9,015,059-B2 illustrates a plurality of monitored equipment (4) coupled to the data processing center (6) through a wireless communication link (8) represented by lines. The data processing center (6) is connected to the system controller (22), which provides a communication hub between the equipment 4, the data processing center (6) and the user control/monitoring locations.

According to document U.S. Pat. No. 9,015,059-B2, equipment (4) can represent heavy equipment, office equipment, surface, land and air vehicles, etc. This includes engines, automobiles, trucks, construction, agricultural or earthmoving equipment, computers, consumer electronics, copiers, printers, etc. Furthermore, the communication link 8 may include a satellite data link, an analog cellular telephone communication link (using, for example, frequency division multiple access (FDMA), a digital cellular communication link (using, for example code division multiple access (CDMA), time division multiple access (TDMA, etc.) a radio link, Bluetooth, Wi-Fi (802.11a, 802.11b, 802.11g, etc.), or a combination thereof. The data processing center 6 receives status information related to the monitored equipment 4.

Document CN 109374120-A disclose a tractor body vibration test system. As shown in FIG. 1 of D2, a tractor whole body vibration test system includes a damping sensor 101, a data acquisition module 102, a wireless communication module 103 and a host computer 104. The damping sensor 101 is disposed on a tractor seat, the data acquisition module 102 is connected to the damping sensor 101, and the wireless communication module 103 is connected to the data acquisition module 102. The host computer 104 is provided with graphical human-computer interaction software written using labview. The wireless communication module 103 includes at least one of an infrared wireless data communication module, a WIFI wireless data communication module, a Bluetooth wireless data communication module, a ZigBee wireless data communication module, and an IoT (Internet of Things) narrowband communication module.

Document CN 109813422-A disclose a method of monitoring equipment in real time in operation. The method has the following steps:

1—configure a plurality of temperature and vibration sensors in the operating device;

The vibration signal and the temperature signal are obtained by the three-axes vibration sensor module built into the vibration temperature sensor; after the filtering module eliminates the clutter, the data processing module converts the acceleration data into the actual vibration speed value, the vibration waveform diagram and the spectrogram. The wireless communication module transmits source data and converted data to the database server for storage via wireless communication transmission;

2—The operating system failure knowledge base is built in the database server, and the Ankang management platform is built in the cloud server, and the platform has an analysis and diagnostics software module and a visual output software module;

The software module of the analysis and diagnostics algorithm extracts the data stored in the database server and performs calculations to obtain the effective value of the total vibration speed of the device in operation and the operating temperature; after analyzing and comparing the data in the operational device failure knowledge base, obtaining the analysis and the result of the safety diagnosis; when the result is displayed in real time through the visual output software module, a real-time warning or alarm is issued according to the predefined failure condition.

The analysis and comparison described in step 2 specifically include:

2.1—Analysis and comparison of the general speed of vibration of the equipment in operation;

After extracting the data by the analysis and diagnostic algorithm software module, the effective value of the vibration speed obtained by each vibration temperature sensor is weighted according to a predetermined rule to obtain the overall vibration speed the device in operation; and then the working device vibration integrated into the working device failure knowledge base is obtained. The values corresponding to the intensity levels are compared to obtain an integrity level of the general speed of vibration of the device in operation;

2.2—Analysis and comparison of the operating temperature of the operating equipment;

After data extraction by the analysis and diagnostic algorithm software module, the temperature values obtained by the temperature and vibration sensors are weighted according to a predetermined rule to obtain the total value of the operating temperature of the device running; and then the operating temperature of the device in operation is summarized in the failure knowledge base of the device in operation. The values corresponding to the classes are compared to obtain the general operating temperature integrity level of the equipment in operation;

2.3—Analysis and comparison of the characteristics of the vibration spectrum of various components of operating equipment.

In the diagnosis result obtained in step 2.1 or 2.2, provided that the integrity level of any of the equipment components in operation belongs to the maintenance that must be interrupted, the software module of the analysis and diagnosis algorithm is analyzed from the vibration waveform and extracting and analyzing the characteristics of the vibration spectrum of each component of the equipment in operation in the spectrogram; then comparing the analysis results with the spectral characteristics of components of different integrity levels summarized in the operating equipment failure knowledge base, and displaying the real-time comparison results by the visual output software module for reference of maintenance personnel.

The documents mentioned in the state of the art do not disclose the technical solution proposed in the present invention: the sensors have autonomy for operation in the field for up to 7 years without the need of changing the battery, as well as characterizing a significant expansion of availability of the diagnostic techniques that can be used to predict the operating condition of the machines monitored by the system, in addition to vibration and temperature, by the sound signature of the machines.

The above-mentioned state of the art does not have the unique features that will be presented in detail below.

Objective of the Invention

It is a first objective to provide a reliable measurement of the dynamic equipment in an oil processing unit, whether it is an oil platform, a refinery or a natural gas processing unit (NGPU).

It is a second objective to reduce the problem of high rework due to the high cost involved with the acquisition, installation and maintenance of asset monitoring systems.

It is a third objective of the invention to continuously monitor the dynamic equipment through the use of sensor modules with functionality for measuring vibration, temperature and sound signature (acoustic rumorosity) associated with wireless technology (wireless) or LTE (Long Term Evolution).

It is a fourth objective of the invention to provide measurement sensor modules with autonomy for operation in the field for up to 7 years without the need of changing the battery.

It is a fifth objective of the invention that the sensor modules of the system have the functionality of self-production of approximately one third of the energy necessary for its operation.

It is a sixth objective of the invention that the sensor modules of the system also have the functionality of measuring the sound signature of the machines.

BRIEF DESCRIPTION OF THE INVENTION

The present invention proposes a system for continuous condition monitoring of dynamic equipment through the use of vibration sensors, temperature and/or acoustic noise associated with wireless technology (wireless) or LTE (Long Term Evolution). The system is characterized by having vibration, temperature and/or acoustic noise sensors. The system sensors also have the functionality to measure the sound signature of the machines. The functionality for measuring the sound signature (acoustic rumorosity) consists of a specific instrumentation chain of the sensor module that includes, among other electronic components, an acoustic rumorosity sensor (sound). This makes it possible for the equipment operating condition analyst to assess changes in the acoustic rumorosity emitted by the equipment and, through the post-processing of the acquired acoustic signals, establish correlations between these variations and possible causes of equipment malfunction, acting preventively and in many cases avoiding premature failures of this equipment.

The system sensors are also characterized by having an autonomy in the field for up to 7 years without the need of changing their batteries. Additionally, the system sensors have the ability of self-producing approximately one-third of the energy required for their operation.

The continuous condition monitoring system for dynamic equipment is characterized by comprising the following elements and their functions: 1—software, 2—server, 3—HUBs, 4—sensor modules.

BRIEF DESCRIPTION OF THE DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

There follows below a detailed description of a preferred embodiment of the present invention, by way of example and in no way limiting. Nevertheless, it will be clear to a technician skilled on the subject, from reading this description, possible additional embodiments of the present invention still comprised by the essential and optional features below.

The continuous condition monitoring system for dynamic equipment is characterized by comprising the following elements and their functions:
1—Software—the computer program that performs the analysis of the acquired signals and Setup of the hubs and sensors;
2—Server—performs communication with hubs and sensors and signal processing codes;
3—HUBs communicates with sensors and manages acquisitions;
4—Sensor Modules—perform the acquisition of vibration, temperature and acoustic noise signals.

Figure 1:
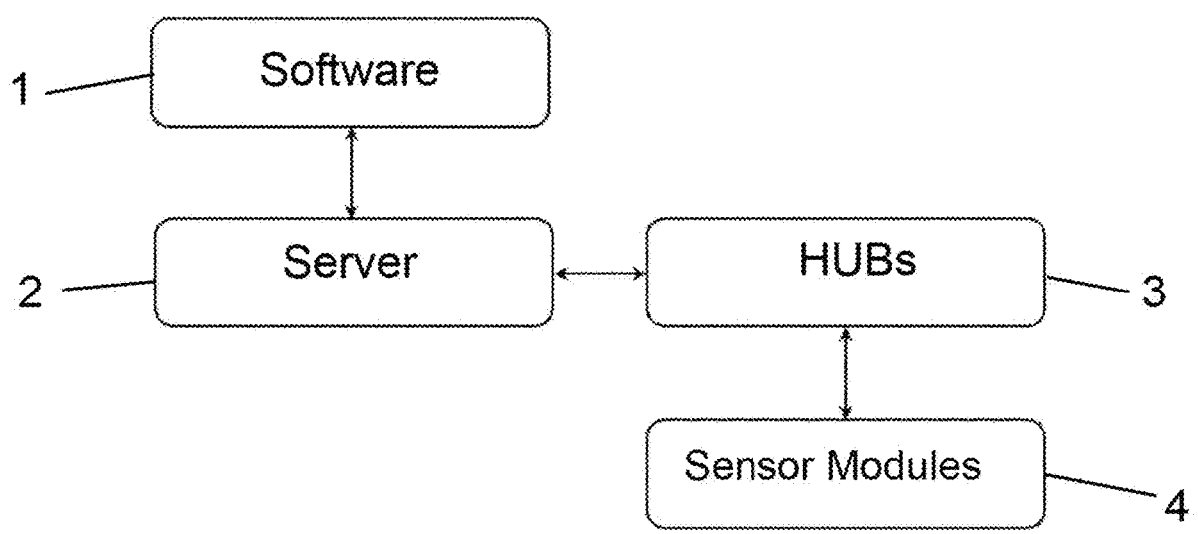
FIG. 1 illustrates a continuous condition monitoring system for dynamic equipment and its elements, represented by: software (1), server (2), HUBs (3), sensor modules (4)

FIG. 1 presents a diagram showing the relation between the components of the invention. The software, as in other equipment condition monitoring systems, is the component that automatically manages the data flow (vibration in the three axes X, Y, Z, temperature and sound signature (acoustic rumorosity), and/or other signal) after configuring the acquisition parameters, along the entire path, from the sensor modules, passing through the HUBs to their filing in the database acquired by the system. It is through the software that the equipment tree of the process plant is designed, a tree in which it is specified which equipment is being monitored and in which equipment each sensor module is mounted. It is used to analyze the signals acquired by the sensor modules (vibration, temperature and sound signature (acoustic rumorosity)) from different tools (trend, temporal analysis, spectral response, filtering, windowing, among others), in addition to having several functionalities for the setup of HUBs and sensor modules such as, for example, the registration of HUBs and sensor modules in the context of the industrial plant in application as described above, the inclusion of the sensitivity of the sensors involved and the time between data acquisitions of the physical quantities that can be monitored by the system (vibration in the three axes X, Y, Z, temperature and sound signature (acoustic rumorosity)).

The software is capable of communicating solely with the server; that is, the entire setup of the HUBs and sensor modules is done by the software through the server, which communicates with the HUBs. It is important to point out that the processing of the signals acquired by the sensors is done on the server. The software can be accessed from any computer (web-based interface), as long as the user has a registered login and password. Thus, when the analyst makes an analysis request, such as filtering a time signal acquired from his computer, a request is sent to the server that performs the process and returns the required information to the computer on which the request was made, such as, for example, a filtered signal. The server has a database with all the acquired signals, in addition to setup information for the HUBs and sensors in the context of the industrial plant being applied. The server can communicate with the HUBs (only) in three different ways: wireless network (wireless), LTE network or ethernet cable. The HUBs are responsible for managing the acquisition of signals of vibration, temperature and acoustic noise requested by the software through the server.

Finally, the sensors only communicate with the HUBs over a Zigbee wireless network. From a request made by the HUBs, the sensors measure and digitize the acquired signals. This information is then transferred to the HUBs, which then send the signals to the server. From there, the analyst can have access to the measurements performed directly in the software.

The invention can be used for continuous monitoring of vibration, temperature and acoustic noise of different machines and equipment in various industry segments (oil and gas, nuclear, naval, railway, automotive, food, etc.). It is important to emphasize that the HUBs and sensors of this invention have certification for operation in explosive environments in zone 0 (area where the formation of explosive mixture exists for long periods or is continuous and protection degree IP66 (protected against dust and strong jets of water).

Figure 2:
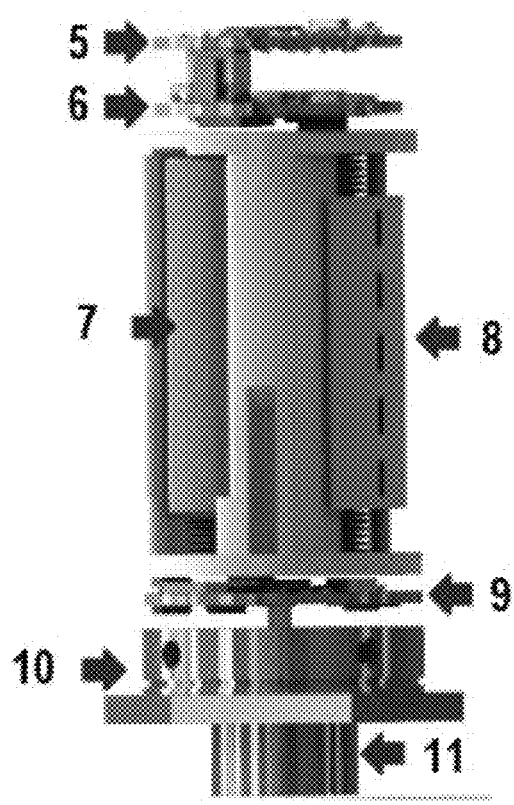
FIG. 2 shows the main parts of the sensor modules, represented by: board A2 (5), board A1 (6), 17,500 lithium battery (SAFT) (7), electromagnetic energy converter (8), board B (9), metal base (10), fixing base (11). Boards A1, A2, and B are electronic boards on which the management/processing central functions, power management and all measurement chains associated with each of the physical quantities that can be monitored with the sensor module (vibration in the three axes X, Y, Z, temperature and sound signature (acoustic rumorosity). The electromagnetic energy converter (8) consists of a mobile block of permanent magnets supported by an elastic suspension and synthetic diamond bearings, which excites a matrix of electromagnetic coils fixed on the main body of the sensor module. The energy produced in the electromagnetic energy converter (8) is managed by board B (9)
Figure 3:
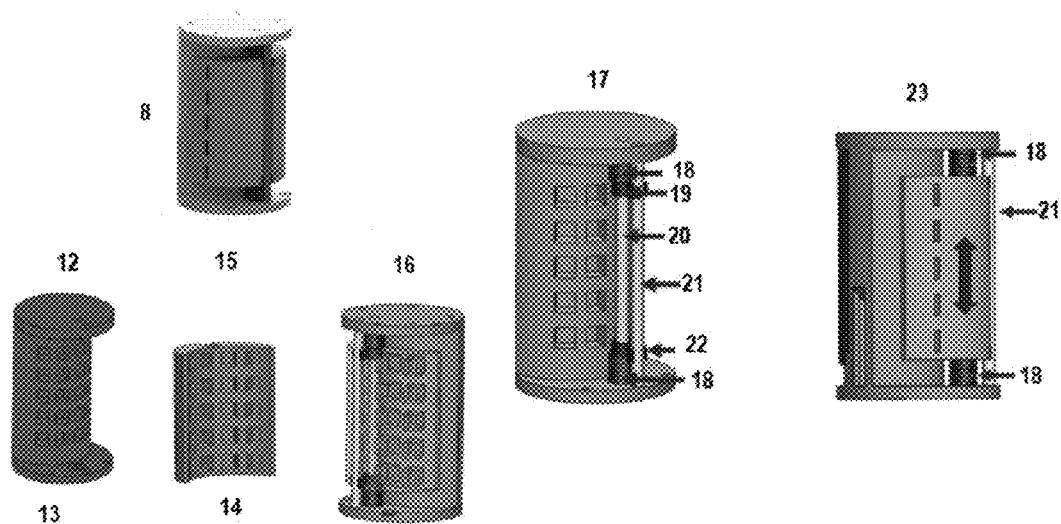
FIG. 3 illustrates the constructive details of the electromagnetic energy converter of the sensor modules and its elements, being represented by: electromagnetic energy converter (8), fixed part (12), wire holder fixing (coils) (13), magnet fixing (14), mobile part (15), coupling of parts (16), components (17), helical spring (18), bearing-1 (19), shaft-1 (20), shaft-2 (21), bearing-2 (22), direction of movement (23). The movement is carried out with the aid of helical springs (18). There are 20 neodymium magnets (14) present (5-mm side cube), 20 coil holders (13), two shafts (shaft-1 responsible for axial movement and shaft-2 responsible for preventing rotation)

The system sensors have the functionality of self-production of approximately one third of the energy required for its operation. This is achieved through a process of harvesting energy in which part of the vibrating mechanical energy of the machine on which the sensor is mounted is converted into electrical energy by an electromagnetic energy converter as indicated on the right in FIG. 2, and duly stored by an electrical charge management electronic sub-module (Board B indicated on the right in FIG. 2). The constructive details and main parts of the electromagnetic energy converter of the sensors are shown in FIG. 3.

Figure 4:
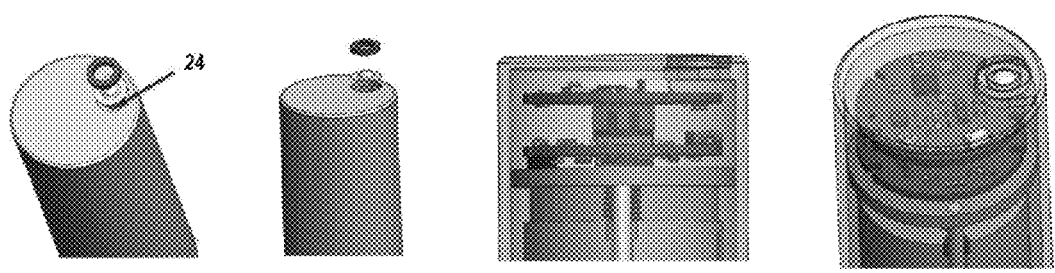
FIG. 4 illustrates the three-dimensional details of the upper electronic boards of the sensors, in which the sensor microphones and their elements are installed, being represented by: microphone access hole (24).

The system sensors also have the functionality of measuring the sound signature (acoustic rumorosity) of the monitored machines through the incorporation of a microphone. This functionality enables a significant expansion of diagnostic techniques that can be used to predict the operating condition of the machines monitored by the system. FIG. 4 shows three-dimensional details of the upper electronic boards of the sensors, in which the sensor microphones are installed.

EXAMPLES

The continuous vibration monitoring system has already been applied in two process plants of a large oil industry and allowed the detection of incipient failures in the equipment in which the system was installed. This allowed preventive maintenance interventions whose costs are, on average, 80% lower in relation to the maintenance costs involved when failures evolve into a catastrophic failure.

The invention claimed is:

1. A system for continuous monitoring of dynamic equipment condition, the system comprising:
   software;
   a server; one or more HUBs;
   sensor modules, each of the senor modules comprising an energy harvester comprising:
   a block of permanent magnets;
   an elastic suspension configured to support the block of permanent magnets;
   a first shaft along which the block of permanent magnets is configured to move;
   a second shaft arranged to prevent the block of permanent magnets from rotating;
   diamond bearings configured to support the block of permanent magnets to move axially along the first shaft; and
   electromagnetic coils electromagnetically coupled to the block of permanent magnets, wherein movement of the block of permanent magnets relative to the electromagnetic coils produces energy; and
   wireless or LTE (Long-Term Evolution) connection.

2. The system according to claim 1, wherein the software is configured to perform an analyses of acquired signals of the HUBs.

3. The system according to claim 1, wherein the software is configured to analyze signals acquired by the sensor modules.

4. The system according to claim 1 wherein signals acquired by the sensor modules installed in the dynamic equipment comprise: vibration, temperature, and sound signature.

5. The system according to claim 1, wherein the sensor modules of the system are configured to self-produce at least one third of the energy required for its operation.

6. The system according to claim 1, wherein the sensor modules have an autonomy for operation of at least 7 years, without the need of changing the battery.

7. The system according to claim 1, wherein the HUBS are configured to communicate with the sensor modules and manage an acquisition of signals from the sensor modules.

8. The system according to claim 1, wherein the server is configured to communicate with the HUBs through a wireless network, an LTE network, or an ethernet cable.

9. The system according to claim 1, wherein the HUBs are configured to manage the acquisition of signals of vibration, temperature, and sound signature requested by the software through the server.

10. The system according to claim 1, wherein the sensor modules are configured to communicate only with the HUBs through a Zigbee wireless network.

11. The system according to claim 1, wherein the sensor modules are configured to carry out measurement and digitization of acquired signals based on a request made by the HUBs.

12. The system according to claim 11, wherein information from the sensor modules is transferred to the HUBs, which send the signals to the server.

13. The system according to claim 12, wherein an analyst accesses measurements performed directly in the software.

* * * * *